United States Patent Office 3,644,584
Patented Feb. 22, 1972

3,644,584
GRAFT COPOLYMERS BEARING AT LEAST TWO
UNLIKE TYPES OF GRAFT COMPONENTS
Michael Fryd, Broomall, Pa., assignor to E. I. du Pont
de Nemours and Company, Wilmington, Del.
No Drawing. Continuation-in-part of abandoned application Ser. No. 640,486, May 23, 1967. This application
Aug. 30, 1968, Ser. No. 756,359
Int. Cl. C08f 19/102, 19/16
U.S. Cl. 260—879                                   28 Claims

ABSTRACT OF THE DISCLOSURE

Graft copolymers having polymeric backbone components and multiple unlike types of graft components, and a method for preparing them. The backbone components can be unsaturated polymers or saturated polymers which provide grafting sites; the graft components can be polymers of graft copolymerizable vinyl monomers.

The graft copolymers are useful as can coatings, as film-forming components in coating compositions and as adhesives.

CROSS-REFERENCE TO RELATED APPLICATIONS

This application is a continuation-in-part of application Ser. No. 640,486, filed May 23, 1967 now abandoned.

BACKGROUND OF THE INVENTION

This invention relates to graft copolymers. It is more particularly directed to graft copolymers having saturated or unsaturated polymeric backbones bearing at least two unlike types of graft components, which can be polymers or copolymers of graft copolymerizable vinyl monomers.

Random copolymers of vinyl monomers have, of course, been known for many years. One of the reasons for preparing such copolymers is the need to build into a single polymeric entity a useful balance of properties, such as hardness, toughness, etc., which cannot be obtained with homopolymers. While such copolymers have been widely used, they have not proved entirely satisfactory because every copolymer designed to obtain a particular balance of properties is, in fact, a compromise since each monomer unit in the copolymer dilutes the beneficial effects of the others.

It is also known that this shortcoming of the random copolymers can, at least to some extent, be avoided by using graft copolymers, where the characteristics of their backbone components and graft components tend to be carried over into the copolymer without the dilution effect. But the number of properties that can be built into a graft copolymer has been limited because heretofore only single types of graft components have been grafted onto backbones.

It has now been found, according to this invention, that multiple unlike types of graft components can be grafted on a single polymeric backbone component.

The number and types of properties which can be built into a graft copolymer of the invention is many times greater than those which can be built into conventional copolymers. This invention therefore opens the door to an enormous potential and permits the preparation of polymers having at the same time a toughness, flexibility, etc. not before possible.

Furthermore, the invention provides polymers which can be dispersed or dissolved in many more types of organic liquids than heretofore possible. This has become increasingly important in recent years because of the interest in and legislation concerning air pollution.

SUMMARY OF THE INVENTION

The backbone component

Any unsaturated polymer or saturated polymer having abstractable hydrogen atoms or other grafting sites can serve as a backbone for the polymers of the invention.

If the backbone is unsaturated, it can be, for example, a polymer of a diene such as 1,2- or 1,4-polybutadiene (both the cis and trans forms), polyisoprene, or polychloroprene. Copolymers of these dienes with up to 95% (by weight) of other copolymerizable vinyl monomers can also be used. Illustrative of these other monomers are aromatic vinyl compounds such as styrene, α-methylstyrene and vinyl toluene; acrylic acid and methacrylic acid and their amides, nitriles and esters with alcohols of 1 through 18 carbon atoms; ethylene and propylene.

If the polymer backbone is saturated, it can be any polymer or copolymer having readily abstractable hydrogen atoms. Illustrative of these are polymers and copolymers of vinyl esters of monocarboxylic acids of 1 through 18 carbon atoms, such as vinyl acetate, vinyl butyrate and vinyl stearate; polyethers such as polyethylene glycol and polypropylene glycol; polyvinyl pyrrolidone; polyurethanes; polyamides; polyesters; and cellulose, nitrocellulose, cellulose acetate and cellulose acetate butyrate. Copolymers of any of the vinyl ester monomers with up to 80% (by weight) of other copolymerizable vinyl monomers can also be used as saturated backbones.

As a backbone polymer one can also use a copolymer of any copolymerizable vinyl monomer with 0.10–10% (by weight) of another monomer which provides grafting sites, such as allyl methacrylate, tetrahydrofurfuryl methacrylate, diethylaminoethyl methacrylate, aminoethyl vinyl ether, 3-(β-methacryloxyethyl)-2,2-spirocyclohexyloxazolidine, acrolein, acrylic acid or hydroxyethyl- or hydroxypropyl methacrylate.

Especially good polymers have diene polymer backbones. Outstanding polymers have backbones of polybutadiene.

The graft component

The graft copolymers of the invention contain at least two different types of graft components, each component with a separate and individual identity being considered a "type." In this respect, the polymers of the invention differ from conventional graft copolymers whose graft components are all of the same type.

The ratio of one graft type to the other(s) can vary widely from a very few of one type and many of the other(s), to the converse. The graft components will, as a general rule, be present in weight ratios of from about 1/1 to about 20/1 to each other, preferably 1/1 to 5/1. The ratio of the molecular weight of one graft type to the molecular weight of the other(s) can vary from about 1/1 to 1/1000, and the ratio of the weight of the backbone to the total weight of the graft components will be from about 20/1 to about 1/20, preferably 5/1 to 1/5.

Described broadly, the graft components can be polymers of any ethylenically unsaturated monomers which will graft copolymerize with the backbones. Illustrative of such monomers are ethylenically unsaturated nitriles such as acrylonitrile and methacrylonitrile, vinyl monomers such as acrylic acid and methacrylic acid, their amides and esters with alcohols of 1 through 18 carbon atoms; glycidyl methacrylate; fumaric acid; itaconic acid; vinyl esters of monocarboxylic acids of 1 through 18 carbon atoms, such as vinyl acetate, vinyl butyrate and vinyl stearate; vinyl halides such as vinyl chloride, vinylidene chloride, vinyl fluoride and vinylidene fluoride; and aromatic vinyl compounds such as styrene, vinyl toluene and α-methyl styrene.

Copolymers of these monomers as well as copolymers of these monomers with up to 50% (by weight) of other monomers such as maleic anhydride, aminoethyl vinyl ether, and dimethylaminoethyl methacrylate also serve as graft components.

Notable graft copolymers of the invention have a polybutadiene backbone and an ethylenically unsaturated nitrile polymer as one type of graft component. Outstanding polymers of the invention have a polybutadiene backbone and graft components of polyacrylonitrile or polymethacrylonitrile and graft components of polyvinyl chloride or polyvinylidene chloride, preferably in backbone/graft weight ratios of 5/1 to 1/10 and graft/graft weight ratios of 1/10 to 10/1.

Preparation of the graft copolymers

The graft copolymers of the invention with unsaturated backbones can be prepared by mixing together suitable amounts of a backbone polymer, one type of grafting monomer and an organic liquid in which the backbone polymer is soluble, such as an aliphatic or aromatic hydrocarbon, an ester or a ketone, together with a free radical polymerization initiator such as benzoyl peroxide, cumene hydroperoxide, azobisisobutyronitrile, lauroyl peroxide, tertiary butyl peracetate, tertiary butyl perpivalate, tertiary butyl hydroperoxide, tertiary butyl peroxy isobuyrate or diisopropylperoxy carbonate.

The exact amount of initiator will vary according to the backbone used. In general, 0.1 through about 1%, by weight of the total monomer charge, of initiator will be satisfactory.

The total concentration of backbone polymer and grafting monomer in the organic liquid will range from about 1% through about 80%, by weight.

This mixture is heated to reflux temperature and held there until polymerization is substantially complete. This point can be determined by periodic sampling and analysis for unreacted monomer. If the graft component is terminated by coupling rather than by disproportionation, polymerization should be carried through to only 70% completion, again determined by periodic sampling and analysis for unreacted monomer; the resulting dispersion should be then stripped of residual monomer by heating it under vacuum.

In either case, the second type of grafting monomer is then added to the resulting dispersion, together with the same amount of initiator used in the first stage. This mixture is agiin heated to reflux temperature and held there until polymerization is substantially complete, as determined by periodic sampling and analysis for unreacted monomer. If the second monomer has a boiling point below about 45° C., the second grafting step is run under pressure, or at low temperature using a redox initiator. As before, if the graft component is terminated by coupling, polymerization should be carried through to only 70% completion and the reaction mass stripped of unreacted monomer.

If the backbone component is to bear only two types of graft components, preparation of the graft copolymer is complete at this point. If the backbone is to bear still other types of grafts, the process just described is repeated for each type.

The graft copolymers of the invention having saturated polymer backbones or copolymer backbones bearing grafting sites (such as allyl methacrylate copolymers) can be made by dissolving enough of the backbone polymer in a suitable solvent, such as a liquid aliphatic- or aromatic hydrocarbon, to make a 1–50% (by weight) solution. This solution is brought to reflux temperature and to it are added, with stirring over a 2-hour period, 20%–1000%, by weight of the solution, of the first type of grafting monomer and 0.1%–10%, by weight of the solution, of a free radical polymerization initiator such as tertiary butyl perpivalate or tertiary butyl peracetate.

After the addition is complete, the reaction mass is heated for an additional ½ to 1 hour.

To the resulting reaction mass is then added a suitable amount of the second type of grafting monomer, in the same fashion as the first type, together with a proportional amount of the same initiator. After addition is complete, the reaction mass is heated for another ½ to 1 hour to complete polymerization.

If other types of graft components are to be grafted to the backbone, this process is repeated for each type, as with the unsaturated backbones.

Whichever method is used, a graft copolymer of the invention can be isolated from the resulting dispersion or solution by simply allowing the liquid medium to evaporate.

Utility

The polymers of the invention are useful as can coatings, coil coatings, packaging films, molding powders, fibers, adhesives, fabric impregnants and as film-forming components in coating compositions. The polymers with polybutadiene backbones and grafts of polyacrylonitrile or polymethacrylonitrile and polyvinyl chloride or polyvinylidene chloride are especially useful as coatings for beverage cans because of their excellent adhesion to metal and their impervious nature, which prevents the can contents from taking on objectionable flavors and odors.

Because of their high thermal stability, those polymers of the invention having polyacrylonitrile as one type of graft component are also useful as wire enamels and as film-forming components in flame-retardant, primer- and industrial maintenance paints.

For these purposes, dispersions prepared according to the methods set out under the heading "Preparation of the Graft Copolymers" can be used directly. The dispersions can be sprayed, brushed, rolled or dipped on suitable substrates, air-dried and then baked at temperatures of 200° F.–500° F. for from 15–30 minutes.

If the dispersions are to be used as paints, it may be desirable to add conventional pigments and conventional paint adjuncts such as plasticizers, etc., in the usual amounts.

DESCRIPTION OF THE PREFERRED EMBODIMENTS

In the following examples, all parts are by weight.

Example 1

Fifty parts of polybutadiene dissolved in 50 parts of V, M and P naphtha, 50 parts of acrylonitrile, 160 parts of V, M and P naphtha and 0.5 parts of tertiary butyl perpivalate were mixed, stirred and heated to 85° C. The temperature of the reaction mass rose without further heating and at the end of one hour stood at 92° C. The temperature remained at this level without further heating for 15 minutes. The mixture was allowed to cool to room temperature and unreacted acrylonitrile monomer was stripped from the resulting dispersion under vacuum at 70° C.

To 200 parts of this dispersion were then added 10 parts of butyl methacrylate, 1 part of methacrylic acid and 0.25 part of tertiary butyl perpivalate. This mixture was heated to 85° C. and held at that temperature for 2 hours. 0.25 part of tertiary butyl perpivalate was then added and the mixture held at 85° C. for another hour.

The resulting dispersion of a graft copolymer, having 57.5% polybutadiene backbone and graft components of 29% polyacrylonitrile and 13.5% butyl methacrylate/methacrylic acid, 10/1 copolymer, contained 38% solids. The polymer particles had an average diameter of about 0.1 micron.

This dispersion was sprayed on an unprimed tin-free steel panel and allowed to air-dry at room temperature. The resulting film was then baked for 15 minutes at 390° F. to give a tough flexible film, impervious to acids and organic solvents. This film showed excellent adhesion to the metal substrate. It could be held in an open Bunsen flame without burning and resisted degradation at that temperature for several minutes.

Example 2

Fifty parts of polybutadiene dissolved in 50 parts of V, M and P naphtha, 50 parts of methyl methacrylate, 160 parts of V, M and P naphtha and 0.5 part of tertiary butyl perpivalate were mixed together and heated for three hours at 80° C.

To the resulting milky dispersion were added 50 parts of acrylonitrile and another 0.2 part of tertiary butyl perpivalate. The mixture was stirred and heated to 85° C. The temperature of the reaction mass rose without further heating and at the end of 1 hour stood at 92° C. The mixture remained at this temperature for 15 minutes, was allowed to cool to room temperature and unreacted acrylonitrile monomer was then stripped from the mass under vacuum at 70° C.

and 17% of a styrene/methacrylic acid 90/10 copolymer graft, contained 43% solids. The dispersed polymer particles had an average diameter of 0.2–0.3 micron.

This dispersion was sprayed on a steel plate and baked at 300° F. for 30 minutes to give a tough, flexible film having excellent adhesion to the metal and good outdoor durability.

To make comparable graft copolymers, one can substitute the materials in Table 2, in the listed proportions, for the methyl methacrylate/allyl methacrylate copolymer, styrene, methacrylic acid, liquid medium and initiator used in Example 3.

Example 4

Polybutadiene, 339 parts (54% solution in liquid aliphatic hydrocarbon, boiling point 140–170° C.), 120 parts of methacrylonitrile, 209 parts of liquid aliphatic hydrocarbon (boiling point 140–170° C.) and 3 parts of tertiary

TABLE 1

| Backbone | Amount | Grafting monomer | Amount | Initiator | Amount | Medium | Amount |
|---|---|---|---|---|---|---|---|
| Polybutadiene | 50 | Vinyl acetate / Styrene/maleic anhydride 90/10 | 50 / 30 | t. Butyl perpivalate | 0.2 / 0.2 | Liquid aliphatic hydrocarbon | 200 |
| Polyisoprene | 50 | Ethyl acrylate / Methacrylonitrile | 50 / 30 | ....do.... | 0.2 / 0.2 | ....do.... | 200 |
| Butadiene/styrene 76/24 | 50 | Butylmethacrylate/ glycidyl methacrylate 95/5. / Styrene | 30 / 50 | ....do.... | 0.2 / 0.2 | ....do.... | 200 |
| Polybutadiene | 50 | Methacrylamide / Stearyl methacrylate | 5 / 50 | ....do.... | 0.2 / 0.2 | ....do.... | 200 |

TABLE 2

| Backbone | Amount | Grafting monomers | Amount | Initiator | Amount | Medium | Amount |
|---|---|---|---|---|---|---|---|
| Methyl methacrylate/ allyl methacrylate copolymer. | 50 | Ethyl acrylate and Acrylonitrile | 40 / 30 | t. Butyl peracetate | 2 | Methyl ethyl ketone/toluene 40/60. | 200 |
| Polyvinyl stearate | 50 | Styrene/maleic anhydride 90/10 / Methacrylonitrile/ methacrylic acid 95/5. | 30 / 30 | ....do.... | 2 / 1 | Liquid aliphatic hydrocarbon. | 200 |
| Polyvinylpyrrolidone | 50 | Styrene/methacrylic acid 90/10 / Methyl methacrylate / Methacrylonitrile | 30 / 30 / 30 | ....do.... | 1 / 1 / 1 | t. Butanol | 200 |
| Polyethylene glycol [1] | 50 | Acrylonitrile / Ethyl acrylate/methacrylic acid 95/5. | 50 / 20 | t. Butyl perpivalate | 2 / 1 | Ethanol | 200 |

[1] Molecular weight 20,000.

The graft copolymer in the resulting dispersion had 38.5% polybutadiene backbone and 38.5% poly(methyl methacrylate) and 23% polyacrylonitrile grafts. The dispersion contained about 45% solids and the dispersed particles had an average diameter of 0.1 micron.

This dispersion was sprayed on a steel panel and treated as in Example 1 to give a hard tough film.

To make comparable graft copolymers, one can substitute the materials in Table 1, in the listed proportions, for the polybutadiene, methyl methacrylate, acrylonitrile, initiator and organic liquid used in Example 2.

Example 3

Fifty parts of a methyl methacrylate/allyl methacrylate 98/2 copolymer were added to 160 parts of a 40/60 mixture of methylethyl ketone and toluene. The mixture was heated to reflux temperature and held at that temperature while 50 parts of butyl acrylate and 2 parts of tertiary butyl peracetate were added, dropwise and with stirring, over a 2-hour period. The reaction mass was held at reflux temperature for 1 hour after the addition of reactants was complete.

To this dispersion, at reflux temperature, were then added over a 2-hour period, dropwise and with stirring, 18 parts of styrene, 2 parts of methacrylic acid and 1 part of tertiary butyl peracetate. The reaction mass was again held at reflux temperature for 1 hour after the reactant addition was complete.

The resulting dispersion of graft copolymer having 41.5% of a methyl methacrylate/allyl methacrylate 98/2 polymer backbone, 41.5% of a polybutyl acrylate graft butyl peroxy isobutyrate were mixed in a kettle. This mixture was stirred and heated to 80° C. The temperature of the reaction mass rose to 85° C. without further heating, and the mixture was held at 85–90° C. for two hours.

At this point, 1.5 parts of the peroxide catalyst in 9.8 parts of the liquid aliphatic hydrocarbon were added and mixture was held at 85–90° C. for two hours.

The reaction mass was then cooled to 80° C. and unreacted methacrylonitrile was removed under a vacuum of 45–55 millimeters. The temperature of the product was raised to 90° C., and then cooled to 65° C.

At this point, 47.8 parts of liquid aliphatic hydrocarbon and 38.6 parts of Cellosolve acetate were added, to give a tan dispersion containing 41% of a graft copolymer having 63% polybutadiene backbone and 37% of a graft component of polymethacrylonitrile. The particle size of the graft copolymer was less than .05 micron.

Example 5

Two hundred parts of the dispersion of Example 4, 1.6 parts of cumene hydroperoxide and 1.6 parts of water were mixed and cooled to 0° C. To this mixture were then added 88 parts of vinyl chloride gas, 1.2 parts of benzoin and 0.3 part of ferrous octoate solution in liquid aliphatic hydrocarbon (6% iron content). This mixture was heated to 5° C. and stirred for 8 hours, the temperature rising slowly to 16° C. during this period.

Unreacted vinyl chloride monomer and liquid hydrocarbon were then stripped from the mixture under a vacuum of 20 mm., at room temperature.

The resulting product was a thick yellow dispersion, 52% solids, of a graft copolymer having 46% of a polybutadiene backbone, 25% of a polymethacrylonitrile graft and 29% of a polyvinyl chloride graft.

This dispersion was roller coated on a raw steel sheet and baked for 12 minutes at 390° F. to give an extremely hard yellow coating about 0.5 mil thick. This sheet was then formed into a beverage can. Beer stored in this can took on no taste from the lining.

Example 6

Two hundred fifty parts of the dispersion of Example 4, 110 parts of vinylidene chloride, 150 parts of liquid aliphatic hydrocarbon (boiling point 140–179° C.), 2 parts of cumene hydroperoxide, 0.5 part of ferrous octoate solution in liquid aliphatic hydrocarbon (6% iron content), 1.5 parts of benzoin and 2 parts of water were mixed, heated to 45° C. and held there for 4 hours.

The resulting thick creamy dispersion contained 25.1% of a graft copolymer having 55% polybutadiene backbone, 29% of polymethacrylonitrile graft and 16% of polyvinylidene chloride graft.

Example 7

Two hundred fifty parts of the graft copolymer dispersion prepared according to paragraph 1 of Example 1 were cooled to 0° C. Seventy-five parts of vinyl chloride, 175 parts of liquid aliphatic hydrocarbon (boiling point 140–170° C.), 2 parts of cumene hydroperoxide, 0.5 part of ferrous octoate solution in liquid aliphatic hydrocarbon (6% iron content), 1.5 parts of benzoin and 2 parts of water were added to the dispersion, with stirring. The reaction was allowed to proceed for 8 hours, with the temperature of the mixture rising slowly to 14° C.

The resulting dispersion contained 17.7% solids. It was stripped at room temperature, under a vacuum of 20 mm., to give a creamy thick dispersion containing 29.6% of a graft copolymer having 54% of a polybutadiene backbone, 29 % of a polyacrylonitrile graft and 17% of a polyvinyl chloride graft.

Example 8

Two hundred fifty parts of a graft copolymer dispersion prepared according to paragraph 1 of Example 1, 75 parts of vinylidene chloride, 175 parts of a liquid aliphatic hydrocarbon (boiling point 140–170° C.), 2 parts of cumene hydroperoxide, 0.5 part of ferrous octoate solution in liquid aliphatic hydrocarbon (6% iron content), 1.5 parts of benzoin and 2 parts of water are stirred together, heated to 45° C. and held at this temperature for 4 hours.

The resulting dispersion is stripped under vacuum at room temperature to give a creamy, thick dispersion, 18.5% solids, of a graft copolymer having 57% of a polybutadiene backbone, 30% of a polyacrylonitrile graft and 13% of a polyvinylidene chloride graft.

It is to be understood that any of the polymers listed under "Backbone Polymer" and any of the monomers listed under "Graft Component" can be substituted, in equivalent proportions, for their counterparts in the foregoing examples, and similarly processed to give graft copolymers of the invention.

I claim:

1. A graft copolymer consisting essentially of
    (A) a backbone component which, before grafting, comprises a diene polymer, and
    (B) at least two graft components, one a homo polymer of an ethylenically unsaturated nitrile, and the other comprising a homo polymer of a vinyl halide or a polymer of acrylic acid, methacrylic acid or an ester thereof with an alcohol of 1–18 carbon atoms.

2. The graft copolymer of claim 1 wherein one of the two graft components is polyacrylonitrile and the other is polyvinyl chloride.

3. The graft copolymer of claim 1 wherein one of the two graft components is polyacrylonitrile and the other is polyvinylidene chloride.

4. The graft copolymer of claim 1 wherein one of the two graft components is polyacrylonitrile and the other is a polymer of acrylic acid, methacrylic acid, or an ester thereof with an alcohol of 1–18 carbon atoms.

5. The graft copolymer of claim 1 wherein one of the two graft components is polymethacrylonitrile and the other is polyvinylidene chloride.

6. The graft copolymer of claim 1 wherein one of the two components is polymethacrylonitrile and the other is polyvinyl chloride.

7. The graft copolymer of claim 1 wherein one of the two graft components is polymethacrylonitrile and the other is a polymer of acrylic acid, methacrylic acid or an ester thereof with an alcohol of 1–18 carbon atoms.

8. The graft copolymer of claim 1 wherein the diene polymer is polybutadiene.

9. The graft copolymer of claim 2 wherein the diene polymer is polybutadiene.

10. The graft copolymer of claim 3 wherein the diene polymer is polybutadiene.

11. The graft copolymer of claim 4 wherein the diene polymer is polybutadiene.

12. The graft copolymer of claim 5 wherein the diene polymer is polybutadiene.

13. The graft copolymer of claim 6 wherein the diene polymer is polybutadiene.

14. The graft copolymer of claim 7 wherein the diene polymer is polybutadiene.

15. A coating composition comprising the graft copolymer of claim 1 dispersed in an organic liquid.

16. A coating composition comprising the graft copolymer of claim 2 dispersed in an organic liquid.

17. A coating composition comprising the graft copolymer of claim 3 dispersed in an organic liquid.

18. A coating composition comprising the graft copolymer of claim 4 dispersed in an organic liquid.

19. A coating composition comprising the graft copolymer of claim 5 dispersed in an organic liquid.

20. A coating composition comprising the graft copolymer of claim 6 dispersed in an organic liquid.

21. A coating composition comprising the graft copolymer of claim 7 dispersed in an organic liquid.

22. A coating composition comprising the graft copolymer of claim 8 dispersed in an organic liquid.

23. A coating composition comprising the graft copolymer of claim 9 dispersed in an organic liquid.

24. A coating composition comprising the graft copolymer of claim 10 dispersed in an organic liquid.

25. A coating composition comprising the graft copolymer of claim 11 dispersed in an organic liquid.

26. A coating composition comprising the graft copolymer of claim 12 dispersed in an organic liquid.

27. A coating composition comprising the graft copolymer of claim 13 dispersed in an organic liquid.

28. A coating composition comprising the graft copolymer of claim 14 dispersed in an organic liquid.

References Cited

UNITED STATES PATENTS

| | | | |
|---|---|---|---|
| 3,262,993 | 7/1966 | Hagemeyer et al. | 260—879 |
| 3,426,102 | 2/1969 | Solak | 260—879 |
| 3,449,471 | 6/1969 | Weitzel et al. | 260—880 |
| 3,288,886 | 11/1966 | Himel et al. | 260—876 |
| 3,397,165 | 8/1968 | Goodman et al. | 260—29.7 |
| 3,405,087 | 10/1968 | Fryd | 260—33.6 |

FOREIGN PATENTS

| | | | |
|---|---|---|---|
| 857,797 | 1/1961 | Great Britain | 260—879 |
| 899,029 | 6/1962 | Great Britain | 260—879 |

JOSEPH L. SCHOFER, Primary Examiner

R. A. GAITHER, Assistant Examiner

U.S. Cl. X.R.

117—161; 260—33.6, 875, 880, 881, 885, 900